US009959563B1

(12) United States Patent
Wu et al.

(10) Patent No.: US 9,959,563 B1
(45) Date of Patent: May 1, 2018

(54) RECOMMENDATION GENERATION FOR INFREQUENTLY ACCESSED ITEMS

(71) Applicant: Amazon Technologies, Inc., Seattle, WA (US)

(72) Inventors: Jianhui Wu, Bellevue, WA (US); Debprakash Patnaik, Bellevue, WA (US); Rui Wang, Urbana, IL (US)

(73) Assignee: Amazon Technologies, Inc., Seattle, WA (US)

( * ) Notice: Subject to any disclaimer, the term of this patent is extended or adjusted under 35 U.S.C. 154(b) by 954 days.

(21) Appl. No.: 14/135,176

(22) Filed: Dec. 19, 2013

(51) Int. Cl.
*G06Q 30/06* (2012.01)

(52) U.S. Cl.
CPC .............................. *G06Q 30/0631* (2013.01)

(58) Field of Classification Search
CPC ............. G06Q 30/02; G06Q 30/0251; G06Q 30/0255; G06Q 30/0241; G06Q 30/0271; G06Q 30/0601; G06Q 30/0277; G06Q 30/0631; G06Q 30/0224; G06Q 30/0641; G06Q 30/00; G06Q 30/0603; G06Q 30/0621

See application file for complete search history.

(56) References Cited

U.S. PATENT DOCUMENTS

| 6,055,513 A | 4/2000 | Katz et al. |
| 7,328,216 B2 | 2/2008 | Hofmann et al. |
| 7,881,984 B2 | 2/2011 | Kane, Jr. et al. |
| 8,090,621 B1 | 1/2012 | Chakrabarti et al. |
| 8,090,625 B2 | 1/2012 | Yi |
| 8,145,512 B1 | 3/2012 | Henne et al. |
| 8,290,818 B1 | 10/2012 | Levitan et al. |
| 8,326,658 B1 | 12/2012 | Lee et al. |
| 8,413,250 B1 * | 4/2013 | Krynski .............. H04L 12/6418 726/2 |

(Continued)

OTHER PUBLICATIONS

MedicalBiostatistics.com "Relative Risk, Odds Ratio, Attributable Risk, and Number Needed to Treat", Oct. 17, 2013, retrieved Apr. 10, 2017, retrieved from http://web.archive.org/web/20131017185221/http://medicalbiostatistics.com/RR-OR-Etc.pdf.

(Continued)

*Primary Examiner* — Maroun P Kanaan
(74) *Attorney, Agent, or Firm* — Knobbe, Martens, Olson & Bear, LLP

(57) ABSTRACT

Systems and methods are disclosed for generating recommendation rules based on the attributes of items that are purchased together at a threshold rate. The attributes of the items may be extracted from item-detail content associated with the items. Using a count of the frequency with which pairs of items include pairs of attributes, a recommendation rule can be created that recommends items with particular attributes to users who access other items with particular attributes. Further, using the recommendation rules, items may be selected for recommendation to users who access an item that lacks historical access data from which to generate recommendations solving the "cold-start" problem. Moreover, negative rules may be generated based on historical access data and attributes of items purchased and/or not purchased together at a threshold rate to prevent the recommendation of particular items to users who access items associated with the negative rules.

28 Claims, 8 Drawing Sheets

(56) References Cited

U.S. PATENT DOCUMENTS

| | | |
|---|---|---|
| 8,577,754 B1 | 11/2013 | Chanda et al. |
| 8,843,430 B2 | 9/2014 | Jojic et al. |
| 2001/0014868 A1 | 8/2001 | Herz et al. |
| 2005/0071251 A1 | 3/2005 | Linden et al. |
| 2008/0120287 A1 | 5/2008 | Guan et al. |
| 2009/0077081 A1 | 3/2009 | Sarma et al. |
| 2010/0169340 A1 | 7/2010 | Kenedy et al. |
| 2010/0268661 A1 | 10/2010 | Levy et al. |
| 2011/0060738 A1 | 3/2011 | Gates et al. |
| 2011/0082734 A1 | 4/2011 | Zhang et al. |
| 2011/0173078 A1 | 7/2011 | Hicks |
| 2013/0013458 A1 | 1/2013 | Uribe et al. |
| 2013/0103634 A1 | 4/2013 | Jojic et al. |
| 2014/0149180 A1 | 5/2014 | Yaseen et al. |
| 2014/0358665 A1 | 12/2014 | Gopalsamy et al. |
| 2015/0095185 A1* | 4/2015 | Katukuri ............ G06Q 30/0631 705/26.7 |

OTHER PUBLICATIONS

Deshpande, M., Item-Based Top-N Recommendation Algorithms, ACM Transactions on Information Systems, vol. 22, No. 1, Jan. 2004, pp. 143-177. [Retrieved Jun. 24, 2016, Google Scholar]. <http://citeseerx.ist.psu.edu/viewdoc/download?doi=10.1.1.102.4451&rep=rep1&type=pdf>.

* cited by examiner

RECOMMENDATION GENERATION FOR INFREQUENTLY ACCESSED ITEMS

INCORPORATION BY REFERENCE

The present application was filed on the same day and shares a common specification with U.S. application Ser. No. 14/135,195, titled "DISCOVERY OF BEHAVIOR-BASED ASSOCIATIONS BETWEEN ITEM FACETS," and with U.S. application Ser. No. 14/135,038, titled "IMPROVING RECOMMENDATIONS WITH THE USE OF NEGATIVE RULES," the disclosures of which are hereby incorporated by reference in their entirety herein.

BACKGROUND

A variety of methods are known for detecting behavior-based associations (associations based on user behaviors) between items stored or represented in a database. For example, the purchase histories or item viewing histories of users can be analyzed to detect behavior-based associations between particular items represented in an electronic catalog (e.g., items A and B are related because a relatively large number of those who purchased A also purchased B). As another example, the web browsing histories of users can be analyzed to identify behavior-based associations between particular web sites and/or web pages.

The detected behavior-based associations are typically used to assist users in locating items of interest. For example, in the context of an electronic catalog, when a user accesses an item's detail page, the detail page may be supplemented with a list of related items. This list may, for example, be preceded with a descriptive message such as "people who bought this item also bought the following," or "people who viewed this item also viewed the following." The detected associations may also be used to generate personalized recommendations that are based on the target user's purchase history, item viewing history, or other item selections.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Introduction

Figure 1:
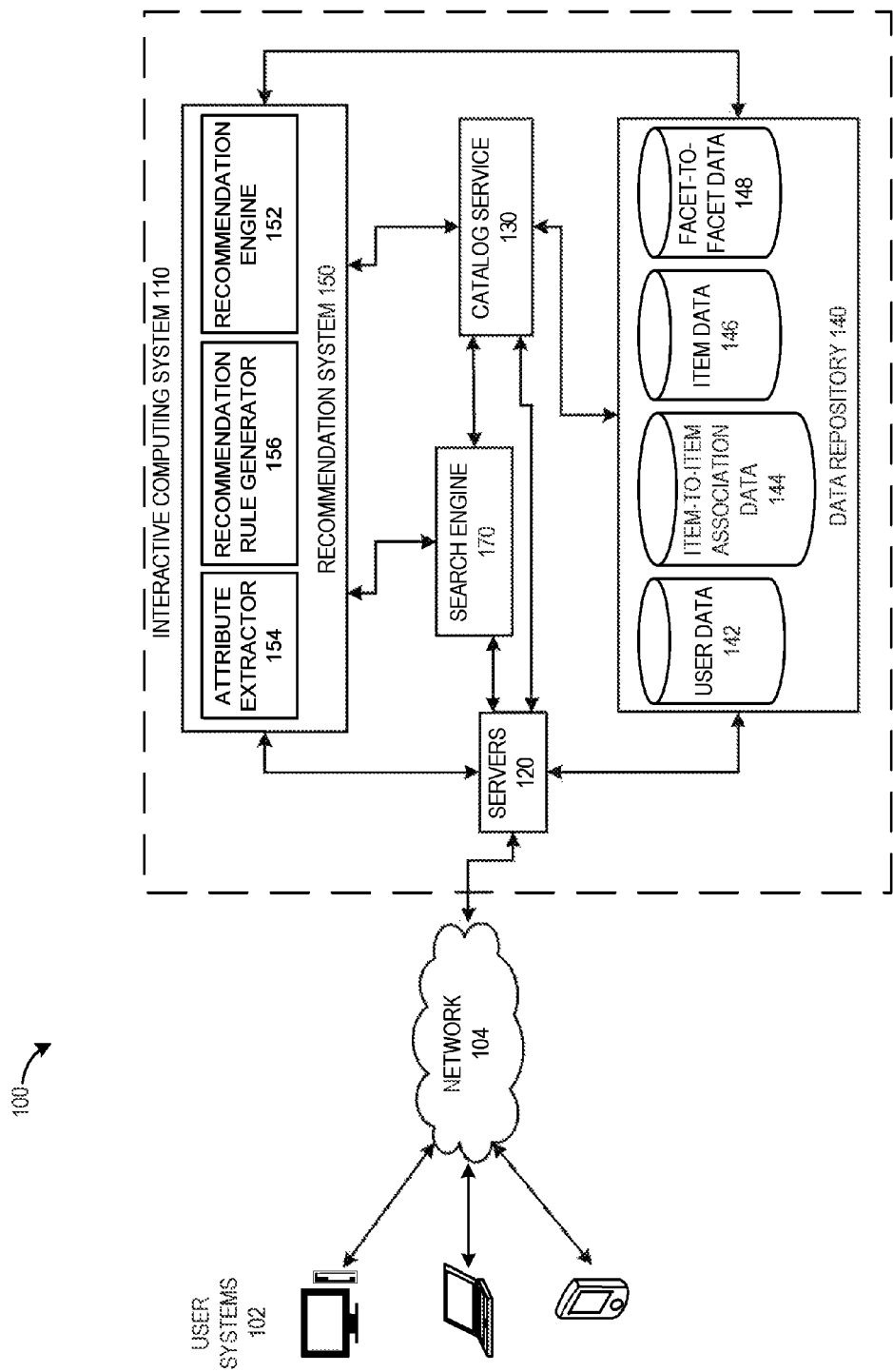
FIG. 1 illustrates an embodiment of a networked computing environment including an interactive computing system.

Developers of electronic commerce ("ecommerce") sites and systems often attempt to increase sales by designing algorithms for selecting items to recommend to users. In some cases, the recommendations are not effective or less effective than the retailer may desire. In some extreme cases, poor recommendations may even cause a loss in sales. Although user based behaviors and item-to-item relationships between items result in improved recommendations, poor recommendations are still sometimes generated. Further, in some cases, the number of items that may be recommended to a user who accesses a particular item may be limited or even zero. For instance, in what is sometimes termed the "cold-start problem," an item that is newly added to a catalog may not yet be associated with any items to recommend because little or no historical access data (e.g., views or sales) exist from which to derive relationships and/or recommendations.

The foregoing and other problems are addressed, in some embodiments, by providing computer-based mining processes for discovering behavior-based associations between particular item characteristics or "facets." A "facet," in one embodiment, is a set of one or more item attributes or descriptors, such as {SLR}, {SLR+CANNON}, or {LED TV+3D}. As an example, by analyzing item purchase data in conjunction with item attributes, the mining processes may discover that users who purchase an item having the facet {LED TV+3D} also frequently purchase an item having the facet {3D+GLASSES}. This more generalized facet-to-facet association may be used as a basis for providing item recommendations where, for example, insufficient item-to-item associations exist for providing recommendations.

For instance, suppose that a new LED TV model is added to an electronic catalog, and has not yet been purchased a sufficient number of times to reliably identify other items that tend to be bought by purchasers of this LED TV model. Conventionally, those who would view the new LED TV in the electronic catalog would be presented with poor quality recommendations (or no recommendations) due to the lack of item-level (purchase-based) associations. Instead, the facet-to-facet association can be used as a basis for providing item recommendations in this situation. For instance, the new LED TV's item detail page could be supplemented with a listing of top selling items selected from the facet {3D+GLASSES}. Stated differently, the facet-to-facet association may be used as (or used to generate) a "recommendation rule." In some cases, an item category can be included as part of a facet. For example, in the above example, LED TV may be an item category and "3D" may be an attribute. The combination of the item category and the attribute may result in the facet {LED TV+3D}.

In some cases, by determining the facets or attributes of items that are purchased together a threshold number of times or at a threshold rate, improved recommendation rules may be derived even when sufficient data exists to generate item-to-item relationships. Further, additional items may be identified for recommendation that were not previously included in recommendations because historical access data did not indicate a relationship between the items to recommend and the accessed item. For example, a camera X may frequently be purchased with particular camera lenses from among a set of compatible lenses. Using embodiments described herein, it may be determined that the camera X has the facet or attribute "SLR" and the oft-purchased lenses have the attribute "black" while other items that are not purchased, including compatible lenses, may or may not have the attribute "black." Using these attributes, a recommendation rule may be derived such that when a user accesses the camera, the lenses with the attribute "black" should be recommended. In some cases, the top selling lenses may be gray, but by using the recommendation rule, the black lenses may be recommended instead of the gray lenses when the camera X is accessed by a user.

Further, embodiments disclosed herein may use attribute relationships to derive recommendations for cold-start items. For instance, a camera Y may be newly added to an electronic catalog. Assuming the camera Y also includes the facet or attribute "black," the recommendation rule described above may be used to generate recommendations for the black lenses.

In addition, more recommendations may be generated using facet-to-facet relationships among items because, in many cases, facet-to-facet associations can be more generalized than item-to-item relationships. For instance, camera X may be associated with lens A because users purchase the two items together at a threshold rate. Thus, when users access camera X, lens A may be recommended. However, if camera X has an attribute "zoom 1×" and the lens A has an attribute "zoom 10×", a recommendation rule may be generated such that lenses with the attribute "zoom 10×" may be recommended to users who access camera X, which may result in a greater number of lenses being recommended, including lenses that have little access history due, for example, to being newly added to an electronic catalog (e.g., the cold-start problem).

In some embodiments, negative rules may be generated to prevent or reduce the occurrence of recommendations of items that are likely of little interest to a user. For instance, continuing the above example with the black camera and the lenses, some of which are black and some of which are gray, a recommendation rule may be derived that prevents the gray lenses from being recommended to users who access the cameras X and Y, which are both black. Thus, using the negative rule, even in cases where the gray lenses may have better sales rankings than the black lenses, the gray lenses are not recommended to users who access the cameras X or Y. Alternatively, using the negative rule, accesses to cameras X or Y may be prevented from being used as a basis for recommending gray lenses. However, in some cases, if there is some other basis for recommending the gray lenses to a user who accesses the cameras X and Y, the gray lenses may still be presented to the user. However, continuing the above examples, assume the user accesses a camera Z, which may have the attribute "red." The camera Z may not be associated with either the above recommendation rule that recommends the black lenses or the negative rule that prevents recommendation of the gray lenses because, for example, the camera Z is not black. Thus, in this example, the gray lenses may be recommended to the user.

In many existing systems, a lack of item-to-item associations may lead to incomplete or unreliable recommendations. However, in certain embodiments of the present disclosure, recommendations or improved recommendations may be generated for items for which item-to-item associations do not exist or for which less than a threshold amount of item-to-item associations exist. Further, in cases where a new item is accessed, embodiments described herein can generate recommendations for additional items regardless of the lack of item-to-item associations.

As used herein, the term "item" is used interchangeably to refer to an item itself (e.g., a particular product) and to its description or representation in an electronic catalog system. As will be apparent from the context in which it is used, the term is also sometimes used herein to refer only to the item itself or only to its representation in the catalog system. Further, the term "item" is not limited and may include physical products, digital products, services, electronic currency, gifts, etc. Moreover, the term "access" may refer to any interaction with an item. For example, access may include purchasing the item, viewing the item, viewing an item-detail page associated with the item, adding an item to a shopping cart, adding the item to a wish list, adding the item to a registry, downloading information associated with the item, or otherwise indicating an interest in an item.

Example Networked Computing Environment

FIG. 1 illustrates an embodiment of a networked computing environment 100 that includes an example interactive computing system 110. The interactive computing system 110 can generally represent a network application, such as a web application or website, for identifying item attributes and features, and for recommending and selling items to a user. In some embodiments, the interactive computing system 110 is associated with a network or Internet-based store or retailer. For example, the interactive computing system 110 may be part of an ecommerce site. In some cases, the interactive computing system 110 may be associated with an Internet-based store that is affiliated with a brick-and-mortar store or retailer.

Users may interact with the interactive computing system 110 via one or more user systems 102. The user systems 102 may include hardware and software components for establishing communications over a communication network 104. For example, the user systems 102 may be equipped with networking equipment and network software applications (e.g., a web browser) that facilitate communications via a network (e.g., the Internet) or an intranet. The user systems 102 may have varied local computing resources such as central processing units and architectures, memory, mass storage, graphics processing units, communication network availability and bandwidth, etc. Further, the user systems 102 may include any type of computing system. For example, the user systems 102 may include any type of computing device(s), such as desktops, laptops, video game platforms, television set-top boxes, televisions (e.g., internet TVs), network-enabled kiosks, computerized appliances, and wireless mobile devices (e.g., smart phones, PDAs, tablets, or the like), to name a few.

The network 104 can include any type of communication network. For example, the network 104 can include one or more of a wide area network (WAN), a local area network (LAN), a cellular network, an ad hoc network, a satellite network, a wired network, a wireless network, etc. Further, in some cases, the network 104 can include the Internet.

The interactive computing system 110 can include a number of systems that facilitate implementing the processes described herein. These systems may be implemented as hardware and/or software. For instance, the interactive computing system 110 can include one or more servers 120, which may be implemented in hardware, for receiving and responding to network requests from the user systems 102. However, some of the capabilities of the servers 120 may be implemented in software. The one or more servers 120 can include a variety of different server types including network servers, web servers, application servers, database servers, and combinations of the same, or the like. Although the interactive computing system 110 may include one or more servers 120, the present disclosure is not limited for use with systems that employ a client/server architecture. Any computing architecture that enables users to access an electronic catalog to browse and/or purchase items may implement the present disclosure.

Further, the interactive computing system 110 may include a search engine 170, which may be implemented in hardware and/or software. The search engine 170 can include any system for searching an electronic catalog. For example, the search engine 170 can search an electronic catalog provided by the catalog service 130. Both the search engine 170 and the catalog service 130 may be in communication with one or more of the servers 120. Users can browse the electronic catalog provided by the catalog service 130 or query the search engine 170 to obtain information about electronic catalog content stored in an item data repository 146.

The electronic catalog content can include information about items available for access or purchase by a user. The items may include any type of item and is not limited in type or form. For example, the items may include physical products, digital products, gifts, electronic currency, and/or services. In one embodiment, the content is arranged in a hierarchical structure having items associated with one or more categories or browse nodes in a hierarchy. The catalog service 130 can provide functionality for users to browse the product hierarchy in addition to searching the catalog via the search engine 170.

In some cases, the hierarchical structure can include a tree-like structure with browse nodes that are internal nodes and with browse nodes that are leaf nodes. The internal nodes generally include one or more child or descendent nodes and the leaf nodes generally do not include child nodes. The internal nodes may be associated with an item category or classification, which can include sub-classifications. The sub-classifications may represent additional internal nodes or leaf nodes. The leaf nodes may be associated with an item category or classification that does not include sub-classifications. In some implementations, the internal nodes are associated with item classifications and sub-classifications, but not items, and the leaf nodes are associated with the items. In other implementations, both the internal and leaf nodes may be associated with items.

Users can select or access an item represented in the hierarchy or in a list of search results to see more details about the item. In response to a user's item selection, the server 120 can provide to a user system 102 a catalog page (sometimes called an item or product detail page) that includes details about the selected item. These details may include an item title, item specifications, manufacturer-provided content, user reviews, and the like.

The interactive computing system 110 also includes a recommendation system 150. The recommendation system 150 can generally include any system for recommending one or more items to a user associated with the user systems 102. The recommendation system 150 may recommend an item in response to a request from a user or from an administrator associated with the interactive computing system 110. Alternatively, or in addition, the recommendation system 150 may recommend an item automatically without receiving a user request. For example, the recommendation system 150 may recommend items in response to a user accessing an item detail page for another item. In some cases, the recommendation system 150 may recommend an item to a user in response to a passage of time since a previous purchase by the user.

The recommendation system 150 includes a number of components that facilitate the recommendation system 150 providing recommendations to users. These components include an attribute extractor 154, a recommendation rule generator 156, and a recommendation engine 152. Each of these components may be implemented as software configured to be executed by hardware of the recommendation system 150. In some embodiments, one or more of the attribute extractor 154, the recommendation rule generator 156, and the recommendation engine 152 may be separate hardware systems and/or may be executed on separate hardware from the recommendation system 150.

In one embodiment, the attribute extractor 154 can include any system that can extract attributes from item-related content associated with an item. In some cases, the attributes may be provided by a manufacturer or a user (e.g., an administrator). In some such cases, the attribute extractor 154 may access the attributes from an item data repository 146 or a facet-to-facet repository 148 in addition to or instead of extracting the attributed from the item-related content associated with the item. The attributes can include any objective or quantifiable information associated with the item. For example, the attributes can include price, color, size, warranty, brand, battery life, noise level, expiration, features, or capabilities. Often, the features or capabilities are specific to particular items or item categories. For example, features of a camera may include "zoom 5×" and "rechargeable battery." As a second example, a television may have the attributes "3D", "HD", "PANASONIC", "black", and "picture-within-picture." In certain embodiments, the attributes may include key words provided by a user. For example, suppose that an item is a book. In such a case, the author of the book, or some other user, may identify keywords to associate with the book based on the content of the book. These keywords may be used as attributes or may be used to determine attributes for the book.

In some cases, attributes may be associated with values. For example, the "zoom" attribute of a camera may be associated with "5×." However, in some instances, attributes may be tags or keywords associated with a product. For example, a camera may include the tag "new" if the item was released for sale within a particular time period. In some embodiments, the attributes may include subjective concepts, such as "zen-styling" or "cheap appearance." Examples of concepts and concept extraction that may be used herein are described in U.S. patent application Ser. No. 13/097,639, filed Apr. 29, 2011, titled "METHOD AND SYSTEM FOR RELATING ITEMS BASED ON CONCEPTS," the disclosure of which is hereby incorporated by reference in its entirety.

The item-related content associated with an item can include any type of professionally-generated content, manufacturer-generated content, retailer-generated content, user-generated content, or free-form text. Typically, the item-related content is text. However, in some cases, the item-related content may include other content, such as pictures, videos, audio, etc. At least some of the item-related content may be included on the catalog page for the item. Further, the item-related content can include both item review content and non-review content. For example, the item-related content can include: user reviews, professional reviews, manufacturer descriptions, retailer descriptions, tags, user-generated lists (e.g., user top ten lists), crowd-sourced content such as wiki-content (e.g., Wikipedia® entries), and forum posts or entries, to name a few. The item-related content can be created by customers or employees of an organization associated with the interactive computing system 110 or by vendors who submit such content to the interactive computing system 110. In addition, the item-related content may be created by users of the interactive computing system 110. Examples of user interfaces and processes that may be used to collect and process reviews from users are described in U.S. Pat. No. 7,664,669, filed Nov. 17, 2000, titled "METHODS AND SYSTEMS FOR DISTRIBUTING INFORMATION WITHIN A DYNAMICALLY DEFINED COMMUNITY," the disclosure of which is hereby incorporated by reference in its entirety.

In one embodiment, the attributes for an item may be determined by a user (e.g., an administrator). Alternatively, or in addition, the attribute extractor 154 extracts attributes or facets by analyzing phrases included in the item-related content. In some cases, a user may confirm whether an extracted attribute is accurate or whether it should be discarded. The attributes can be based on the phrases and/or quotes included in the item-related content. Further, the attribute extractor 154 can identify and combine similar or identical attributes that are described differently into a single attribute. For example, the attribute extractor 154 can combine "3D", "3-D" and "Three Dimensional" into a single attribute.

A number of natural language processing techniques can be used for identifying attributes to extract from the item-related content. For example, assuming that the item-related content is a manufacturer's item description, one process can begin by identifying and filtering out stop words included in the item description. The stop words can include words on a predetermined list of words that are identified as unlikely to facilitate attribute identification. For example, the list of stop words can include articles, prepositions, and linking verbs, to name a few. In some embodiments, the list of stop words may differ based on the item-related content and/or the type of attributes to be extracted.

The example process for identifying attributes can further include shortening each word, or a pre-specified subset of words, to their root form. Further filtering may be performed to remove brand names and marketing terms. Each remaining word can be considered a potential attribute. In some embodiments, pattern matching can be used to identify phrases as attributes. In some cases, attributes may be identified manually by, for example, an employee of an organization associated with the interactive computing system 110.

In some embodiments, the attribute extractor 154 may extract attributes or facets for an item by analyzing search queries provided to the search engine 170 to identify keyword combinations used to search for one or more items. For instance, the attribute extractor 154 may identify search terms or phrases that are most common or that are used a threshold percentage of times to search for an item. These search terms or phrases may be used as attributes or to identify attributes for one or more items accessed or viewed by a user in response to receiving the search results for the search query.

The recommendation rule generator 156 can include any system that can generate a recommendation rule based on behavioral information for items. The behavioral information can include any information related to users' interaction with items. For example, the behavioral information may include sales, item search queries, and item views, etc. Further, the recommendation rule generator 156 can analyze the relation between different items based on the attributes of the items to generate a recommendation rule. For example, if the recommendation rule generator 156 determines that a threshold number or percentage of users who purchase a digital camera with the attribute "rechargeable" also purchase batteries with the attribute "Li-ion", the recommendation rule generator 156 may generate a recommendation rule that recommends (or nominates or promotes for recommendation or includes in a pool of items eligible for recommendation) a battery with the attribute "Li-ion" each time a user accesses or purchases a digital camera with the attribute "rechargeable."

Further, by analyzing the relation of item attributes between item purchases or views, in some cases, it is possible to identify less intuitive or non-intuitive recommendation rules. For example, if the recommendation rule generator 156 determines that users who access or purchase items with the attribute "red" access or purchase items with the attribute "historical" a threshold percentage or number of times, the recommendation rule generator 156 may generate a recommendation rule that recommends books and movies with the attribute "historical" for users who view items with the attribute "red."

As a second example of a non-intuitive recommendation rule, the recommendation rule generator 156 may generate a rule that users who purchase a laptop computer that is associated with a price attribute of "<$500" should be recommended a cell phone that is associated with the attribute "unlocked." This rule may be determined based at least in part on an analysis of historical sales data and item attributes for laptops and cell phones. In some cases, recommending an unlocked cell phone may be unintuitive because it is often the case that an unlocked cell phone costs more, and sometimes quite a bit more, than a locked cell phone. The locked cell phone is in many cases cheaper because many cellular service providers subsidize the cell phones in exchange for users signing up for a usage contract. Thus, one might expect that users who purchase cheap laptops would purchase locked cell phones. However, although the unlocked cell phone may itself be more expensive than a locked cell phone, it is often the case that users can save money in the long term by purchasing unlocked cell phones because it is often possible to obtain cheaper cellular phone service with a non-contract cell phone plan than with the contract plans offered by cell phone service providers.

In some embodiments, the recommendation rule generator 156 can determine negative rules. Negative rules may include recommendation rules that explicitly filter or prevent an item from being recommended to a user who purchases, views, or otherwise accesses another item. For example, suppose that the recommendation rule generator 156 determines by, for example, accessing the facet-to-facet data repository 148, that users who access or purchase cameras with attribute "brand X" purchase camera cases with attribute "brand Y" less than a threshold percentage or number of times when a camera case is purchased with a camera. In such a case, the recommendation rule generator 156 may generate a recommendation rule (or negative rule) that prevents or reduces the occurrences of recommending a camera case with attribute "brand Y" to a user who accesses a camera with attribute "brand X." Alternatively, the recommendation rule generator 156 may prevent access of the camera with attribute "brand X" from being used as a basis to recommend a camera case with the attribute "brand Y." However, in some instances, the recommendation engine 152 may still recommend the camera case with the attribute "brand Y" if other recommendation rules exist that result in the camera case being eligible for recommendation.

In some embodiments, the determination of recommendation rules and/or negative rules is based on historical sales data. However, other data may be using in addition to or instead of the historical sales data. For example, the recommendation rules may be generated based on item views or item returns. For instance, continuing the previous example, the determination of the negative rule that prevents the recommendation of camera cases with the attribute "brand Y" for users who access a camera with the attribute "brand X" may be generated based on the percentage of users who initially purchase the "brand Y" camera case who then return the camera case.

The recommendation engine 152 can include any system that can identify one or more items to recommend to a user using one or more recommendation rules based on items the user has previously accessed or is accessing at the time of recommendation. In some cases, the recommendation engine 152 may use negative rules to facilitate generating the recommendation. In some embodiments, the recommendation engine 152 may identify an initial set of items to recommend using alternative recommendation techniques from those disclosed herein. In such embodiments, the recommendation engine 152 may then use the recommendation rules of the present disclosure to select the item to recommend from the initial set of items. Alternatively, or in addition, the recommendation engine 152 may use the negative rules to prevent recommendation of one or more of the items in the initial set of items identified for recommendation.

In addition to the aforementioned systems, the interactive computing system 110 may include a data repository system 140. The data repository system 140 can generally include any repository, database, or information storage system that can store information associated with items and users. This information can include any type of data including: item descriptions, item attributes, account information, customer reviews, item tags, or the like. Further, this information can include relationships between items, between users, and between items and users.

As illustrated in FIG. 1, the data repository 140 can include a user data repository 142, an item-to-item association data repository 144, an item data repository 146, and a facet-to-facet data repository 148. Although illustrated as separate repositories, in some cases the repositories may be combined. Further, in some cases, the repositories may be implemented on one or multiple computing systems.

The facet-to-facet data repository 148 can store relationships between facets or attributes of items. This information can be used by the recommendation rule generator 156 to generate recommendation rules based on the attributes or facets of items. For example, the facet-to-facet data repository 148 can store a relationship that indicates that users who access televisions associated with the facets or attributes {3-D, 42-inch screen} purchase glasses with the attributes {3-D, 2-pack, black} at a threshold rate. The recommendation rule generator 156 can generate a rule based on this relationship that users how access a television with the attributes {3-D, 42-inch screen} should be recommended glasses with the attributes {3-D, 2-pack, black}. In certain embodiments, a 2-pack of black 3-D glasses may be recommended to a user regardless of whether the specific television model accessed by the user is associated with the selected glasses based on access history as long as the television includes the attributes {3-D, 42-inch screen}. In other words, in some cases, even where historical access or purchase history does not indicate a relationship between a television and a set of glasses, the glasses may be recommended to a user who accesses the television based at least in part on a relationship between the attributes of the television and the set of glasses.

The user data repository 142 can store information associated with a user including account information, user purchase information, user demographic data, item view information, user searches, identity of items owned by a user (e.g., purchased or obtained as a gift), and the like. Further, the user data repository 142 can store the identity of facets or attributes of items accessed by a user or associated with a threshold number or percentage of items accessed by a user. In some cases, the user data repository 142 may store relationships between users based on similarities in item purchase profiles.

The item data repository 146 can store any information associated with an item. For example, the item data repository 146 can store item descriptions, customer reviews, item tags, manufacturer comments, etc. Further, the item data repository 146 can store attributes, such as those extracted by the attribute extractor 154 and/or those provided by an item manufacturer, associated with each of the items in the item data repository 146.

The item-to-item association data repository 144 can store any information that relates one item to another item. For example, the item-to-item association data repository 144 can store a relationship indicating that users who purchase item X tend to purchase item Y at least 75% of the time. Further, the item-to-item association data repository 144 may store relationships between item categories. In some cases, the recommendation engine 152 may use the relationships in the item-to-item association data repository 144 to generate a recommendation rule. For instance, a recommendation rule may state that item Y should be recommended to users who access item X because of the relationship that users who purchase item X tend to purchase item Y at least 75% of the time. In some embodiments, different recommendation algorithms performed by the recommendation engine 152 may utilize the recommendation rules differently. For example, suppose a recommendation rule states that users who purchase electronics with the attribute "$1,000+" purchase the extended warranty with attribute "3 years." One recommendation algorithm may cause the warranty to be presented to the user who accesses an electronic device costing more than a thousand dollars. Another recommendation algorithm may cause the warranty to be included in a list of potential recommendations if a user has previously purchased a warranty, but may cause the warranty to be not included in the recommendation otherwise.

In some embodiments, the item-to-item association data repository 144 may include additional information that relates items based on sales or popularity. For example, the item-to-item association data repository 144 can include information identifying products that were first available in a specific year, products that share a product classification, or products that share a sales ranking (e.g., products on top ten sales list by volume and/or by monetary sales numbers). In some embodiments, the item-to-item associations may be generated using one or more of the embodiments described in U.S. Pat. No. 7,685,074, which was filed on Nov. 19, 2004 and is titled "DATA MINING OF USER ACTIVITY DATA TO IDENTIFY RELATED ITEMS IN AN ELECTRONIC CATALOG," the disclosure of which is hereby incorporated by reference in its entirety.

Overview of Example Process for Generating Recommendations

Figure 2:
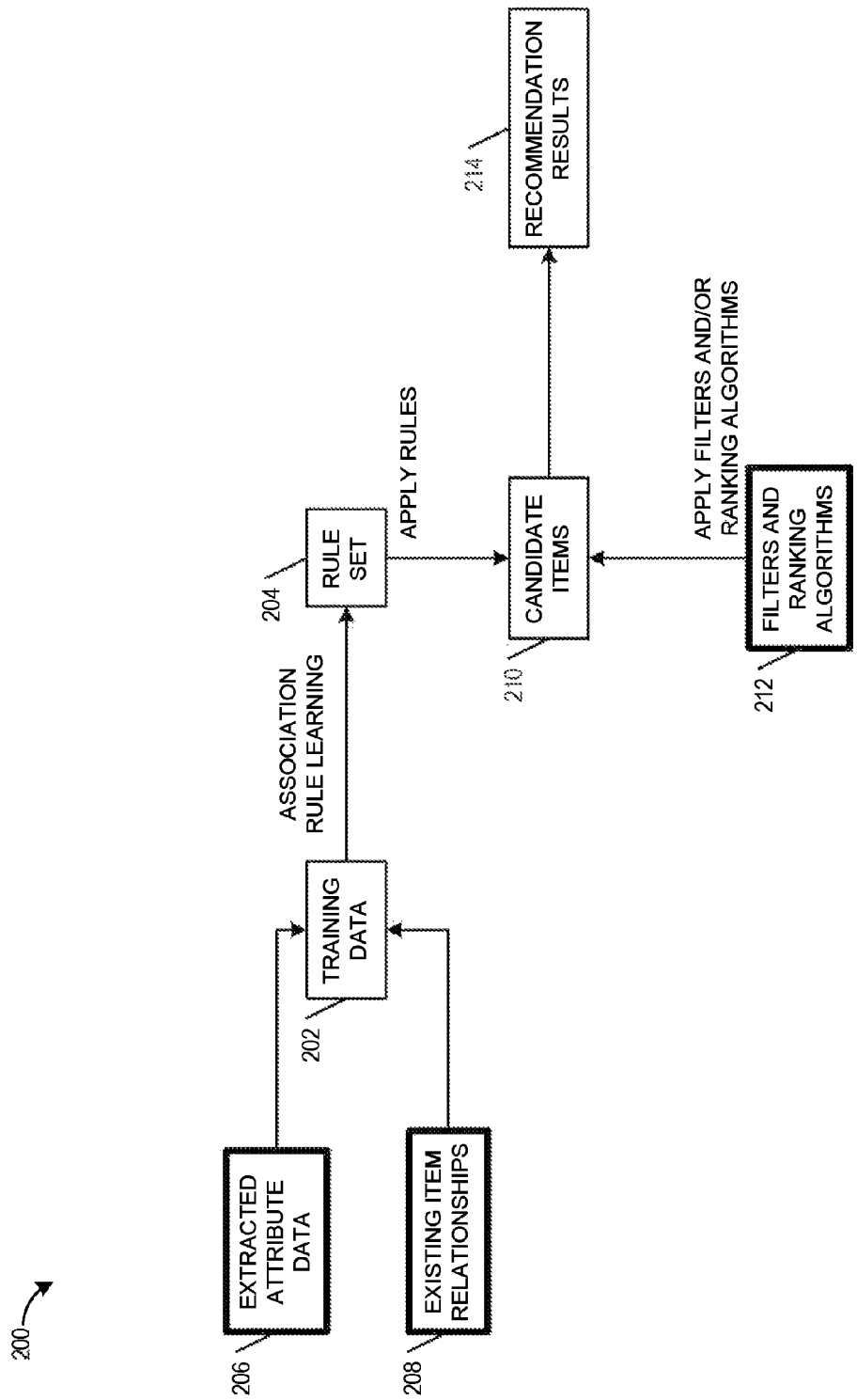
FIG. 2 illustrates a dataflow diagram for one embodiment of a process for generating recommendations based on discovered facet-to-facet associations.

FIG. 2 illustrates a dataflow diagram for one embodiment of a process 200 for generating recommendations based on mining item associations. The process 200 may be implemented by one or more of the systems previously described with respect to FIG. 1. To simplify discussion, the process 200 is described generally without reference to specific systems, which are described in more detail with respect to FIGS. 3-8.

The process 200 begins by generating or accessing training data at the block 202, which may be used to generate recommendation rules at block 204. This training data may include attributes 206 that are extracted from one or more items. Further, the training data may include existing item relationships 208. Typically, but not necessarily, the items included in the existing item relationships 208 are the same items as the items whose attributes are included in the attributes 206. The item relationships 208 may include any type of item relationships. For example, the item relationships 208 may include items that are related based on the frequency of the items being purchased together by a user. For instance, the item relationships may be of the type "users who purchased item X also purchased item Y" a threshold number or percentage of times. In some cases, the item relationships 208 may be determined by a user (e.g., an administrator) associated with an entity that includes the interactive computing system 110. In some embodiments, items relationships may include relationships that indicate items are rarely purchased together or are purchased together at less than a threshold rate.

Using the extracted attribute data 206 and the existing item relationships 208, the process 200 may determine one or more rules for generating recommendations based on one or more attributes associated with an item. Further, the process 200 may use the recommendation rules on one or more candidate items 210 to generate recommendations for users who access the one or more candidate items 210. In some instances, negative rules may be generated that prevent the recommendation of items with a particular attribute to users who access an item associated with the negative rule. In some cases, one or more filters and ranking algorithms 212 may be applied to the recommendations generated for the candidate items 210 using the recommendation rules. For instance, a sales ranking filter may be used to identify an item with the highest sales rank from among a number of items identified for recommendation for a candidate item 210 using one or more of the recommendation rules. Additional filters may be based on other popularity lists (e.g., user created top ten lists), user-to-user relationships, item-to-item relationships, etc. The recommendation results 214 may then be output for recommendation to a user who accesses the candidate item 210. The processes involved in generating the training data, the recommendation rules, and the recommendations for candidate items are described in more detail with respect to FIGS. 3-8 below.

As previously described, the process 200 may use existing item-to-item associations (e.g., existing item relationships 208) to facilitate generating recommendation rules based on relationships between attributes, which may be termed attribute-to-attribute associations or facet-to-facet associations. However, in some embodiments, the process 200 may omit the existing item-to-item relationships. Instead, in some cases, attribute-to-attribute associations may be generated directly based on behavioral data associated with the attributes. For instance, the process 200 may use historical data indicating that items with attributes X are accessed together with items having attribute Y at threshold rate, which may differ based on the attribute and/or item.

Example Training Data Generation Process

Figure 3:
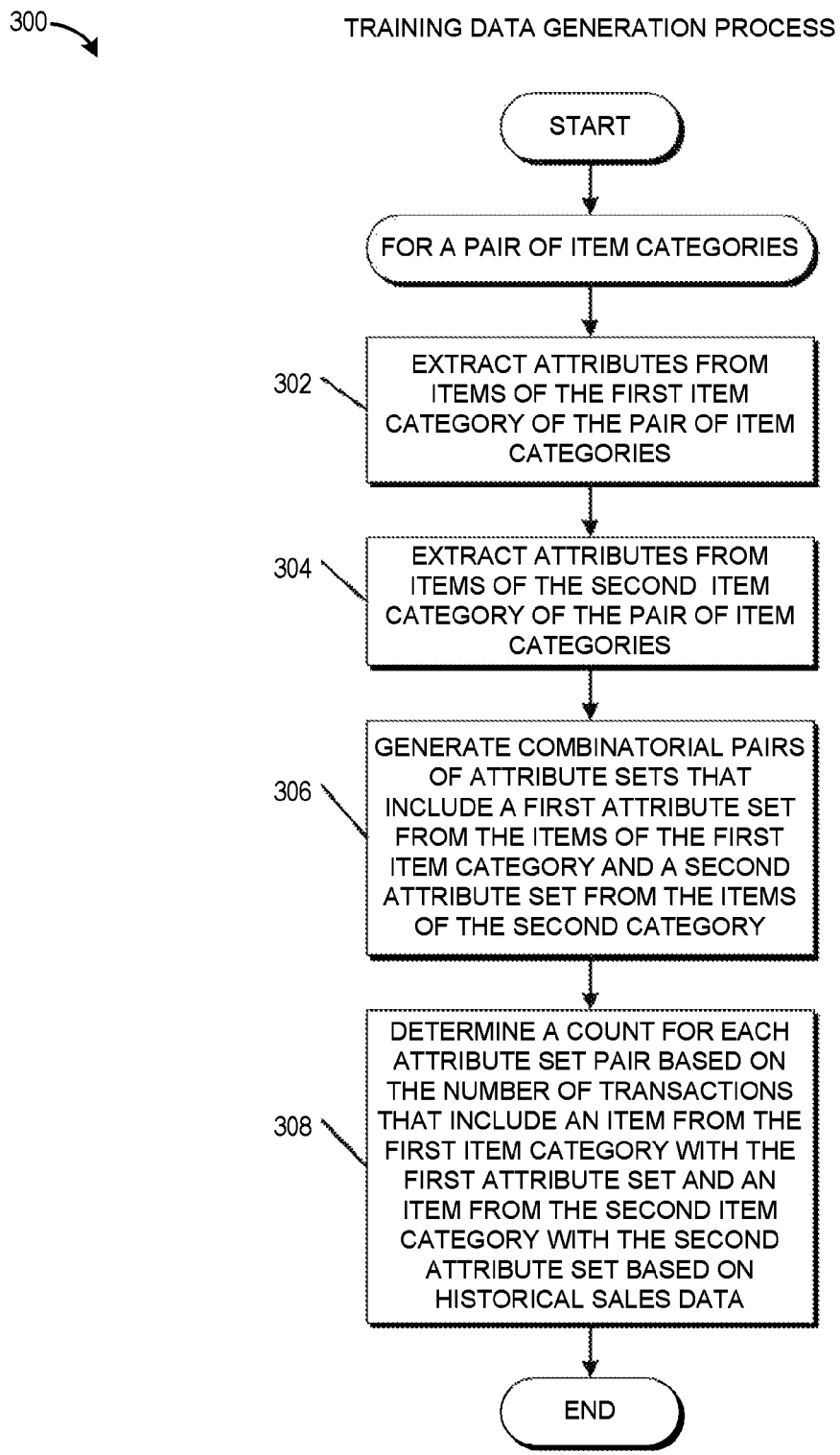
FIG. 3 illustrates a flow diagram for one embodiment of a training data generation process.

FIG. 3 illustrates a flow diagram for one embodiment of a training data generation process 300. The process 300 can be implemented by any system that can obtain and/or generate training data that may be used for recommendation rule generation, which is described further with respect to FIG. 4. For example, the process 300, in whole or in part, can be implemented by a recommendation system 150 or an attribute extractor 154. Although any number of systems, in whole or in part, can implement the process 300, to simplify discussion, the process 300 will be described with respect to particular systems.

The process 300 may be performed for a pair of item categories. The pair of item categories may be selected based on a relationship between the item categories. This relationship may include a determination that a percentage or number of accesses of items within one or both of the item categories is followed by an access of items within the other item category of the pair of item categories within a threshold time-period, which may vary based on the pair of item categories. For example, the threshold time-period between a purchase of a camera and a camera case may differ from the threshold time-period between a purchase of a video game console and a microphone headset. Alternatively, or in addition, a pair of item categories may be specified by a user (e.g., an administrator). In other embodiments, the process 300 may be performed for each pair of item categories within electronic catalog. Alternatively, or in addition, the process 300 may be performed for a single item category with item pairs being created based on the items of the single item category.

The process 300 begins at block 302 where, for example, the attribute extractor 154 extracts attributes from items of the first item category of the pair of item categories. As previously described, the attributes can be extracted from item-related content associated with the items. Further, as previously described, the attributes can include any type of attribute that can be associated with an item, such as brand, model, color, feature, etc. In some embodiments, the attributes may include the first item category as an attribute of the items. In some such instances, the item category may be treated as a special attribute. Further, in some implementations, the attributes may include negative attributes. For example, an attribute of an item may be "no preservatives" or "non-rechargeable batteries." The item category may include any categorization applied to an item. In some cases, the item category may be the browse node or node that includes the item in a hierarchical catalog of items as may be generated by, for example, the catalog service 130.

At block 304, the attribute extractor 154 extracts attributes from items of the second item category of the pair of item categories. In some embodiments, the attribute extractor 154 extracts attributes from every item included in the first item category and every item included in the second item category. Alternatively, the attribute extractor 154 extracts attributes from a subset of items included in the first item category and a subset of items included in the second item data. The subset of items may be selected based on a relationship between the selected items of the first item category and the selected items of the second item category. For example, items of the second category may be selected based on a frequency with which the items of the second category are accessed with items of the first category within a threshold time period.

The attribute extractor 154 at block 306 generates combinatorial pairs of attribute sets that include a first attribute set from the items of the first item category and a second attribute set from the items of the second category. Each attribute set may include one or more attributes extracted at the block 302 or 304. Further, in some cases, the attribute set may include the item category as an attribute or a special attribute. In some cases, the combinatorial pairs of attribute sets include an attribute pair for every attribute extracted from the items of the first item category and the items of the second item category. In other cases, the combinatorial pairs of attribute sets include an attribute pair for a subset of the attributes extracted from the items of the first item category in the items of the second item category. This subset of the attributes may be selected based on determined relationships between the items from which the attributes were extracted.

At block 308, the recommendation system 150 determines a count for each attribute set pair based on the number of transactions that include an item from the first item category with the first attribute set in an item from the second item category with the second attribute set based on historical sales data. The transactions, in some cases, may be limited to purchases of items. However, in other cases, the transactions may include accesses of items regardless of whether the access includes a purchase. In some cases, the count may include accesses of items from the second item category with the second attribute set that occur within a threshold time period of an access or purchase of the item from the first item category with the first attribute set. Furthermore, the historical sales data may include all sales data since a time when the items from the first item category and the second item category were made available for access by users. Alternatively, the historical sales data may include sales data within a particular time period. In certain embodiments, each transaction included in the count may be weighted based at least in part on the age of the transaction, the amount of time between a purchase or view of the first item and the purchase or view of the second item, the price of items included in the transaction, discounts apply to one or more of the items in the transaction, a type of access of the first item and/or second item, or any other factor that may be used to generate a weighted count value. In some cases, a transaction may not be included in the count if a threshold time between access of the first item and access of the second item is not satisfied. For instance, if two months exist between the purchase of the first item and the second item and the threshold time period is one month, the transaction may not be included in the count. In some implementations, item accesses of a particular type may be excluded from a count. For example, in some cases, if the first item is accessed by viewing its item-detail page, and the second item is accessed by being added to a wish list, the transaction may be excluded from the count.

TABLE 1

| Item Category 1 (Attribute) | Item Category 2 (Attribute) | Count |
| --- | --- | --- |
| LED TV (42-inch) | 3D Glasses (Black) | 600 |
| LED TV (1080 p) | 3D Glasses (VIZIO) | 745 |
| LED TV (120 HZ) | 3D Glasses (2-Pack) | 322 |
| LED TV (3-D) | 3D Glasses (Black) | 1,250 |
| LED TV (3-D) | 3D Glasses (Disposable) | 10 |
| LED TV (3-D) | 3D Glasses ( ) | 6,029 |
| . . . | . . . | . . . |

Table 1 illustrates a portion of a table indicating a count of item accesses and/or item transactions for pairs of items of a first item category and a second item category include an attribute pair. For instance, as can be seen from Table 1, 600 transactions occurred within the counted time period that included an LED TV with the attribute of "42-inch" and 3-D glasses the attribute of "black." In some cases, each of the 600 transactions may have been for the same model LED TV and/or the same model 3-D glasses. In other cases, the 600 transactions may have included a variety of LED TVs with the attribute "42-inch" and/or a variety of 3-D glasses with the attribute "black." Further, although each of the counts illustrated in Table 1 consist of whole numbers, in some cases the counts may include fractions, such as when the counts include weighted count values. Moreover, although the attribute pairs are illustrated in Table 1 as including one attribute per item, in some cases, the attribute pairs may be attribute set pairs made up of an attribute set for the item (e.g., the LED TV) of Item Category 1 and an attribute set for the item (e.g., the 3D Glasses) of Item Category 2.

In some embodiments, a count may be determined for an attribute pair that includes a particular attribute for an item or items of a first item category and any attribute of items from a second item category. In other words, the second attribute can be considered a wildcard attribute. For example, as can be seen from Table 1, 6,029 transactions occurred within the counted time period that included an LED TV with the attribute of "3-D" and 3D glasses. Thus, in this example, of 6,029 transactions (and/or item accesses) that included an LED TV with the attribute "3-D," a user accessed an item in the 3D glasses category.

As is discussed in more detail below with respect to FIG. 4, the training data generated using the process 300 (e.g., the counts of the block 308) may be used to generate one or more recommendation rules. Further, in some cases, the training data may be used to generate one or more negative rules. For example, based on the count data of Table 1, a negative rule may be created to prevent recommendation of disposable 3D glasses to users who access or purchase an LED TV with the attribute "3-D."

Example Recommendation Rule Generation Process

Figure 4:
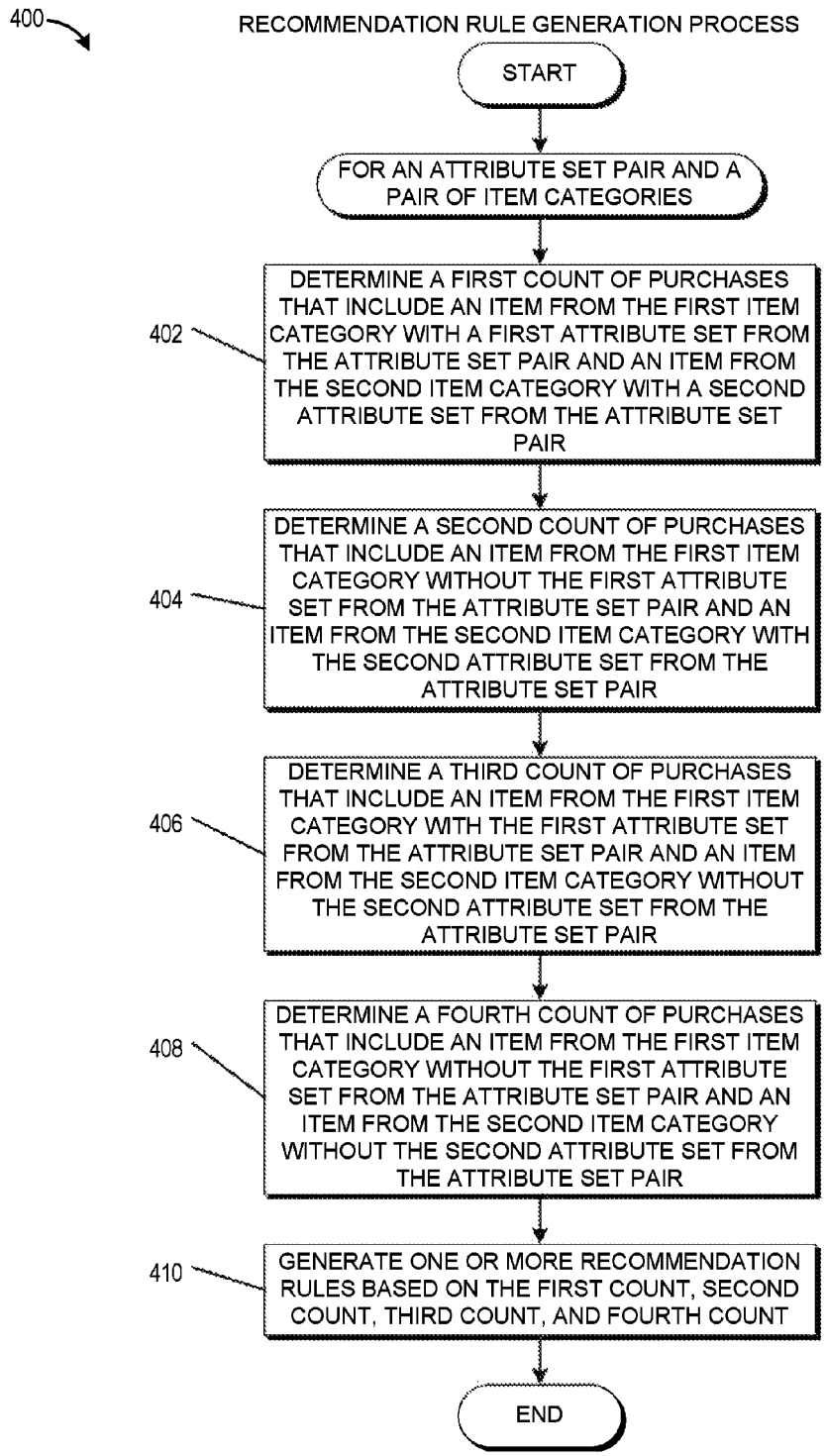
FIG. 4 illustrates a flow diagram for one embodiment of a recommendation rule generation process.

FIG. 4 illustrates a flow diagram for one embodiment of a recommendation rule generation process 400. The process 400 can be implemented by any system that can generate recommendation rules based on training data (e.g., as generated using the process 300), sales data, and/or item access data. For example, the process 400, in whole or in part, can be implemented by a recommendation system 150, a recommendation engine 152, an attribute extractor 154, or a recommendation rule generator 156. Although any number of systems, in whole or in part, can implement the process 400, to simplify discussion, the process 400 will be described with respect to particular systems.

The process 400 may be performed for an attribute set pair of a pair of item categories. The pair of item categories may be selected based on the relationship between the item categories. Alternatively, or in addition, the pair of item categories may be selected based on a count associated with the attribute set pair. In some embodiments, the process 400 may be performed for each attribute set pair created using the process 300. In addition, as previously described with respect to the process 300, the process 400 may be performed for an attribute set pair that includes a wildcard attribute.

Process 400 begins at block 402 where, for example, the recommendation system 150 determines a first count of purchases that include an item from the first item category with a first attribute set from the attribute set pair and an item from the second item category with a second attribute set from the attribute set pair. In some embodiments, the first count may include item accesses, such as item views or views of an item detail page associated with an item, that occur within a threshold time period of each other for the pair of items. Further, the block 402 may include accessing a count value determined at the block 308 as part of the process 300.

At block 404, the recommendation system 150 determines a second count of purchases that include an item from the first item category without the first attribute set from the attribute set pair in an item from the second item category with the second attribute set from the attribute set pair. The recommendation system 150 determines a third count of purchases that include an item from the first item category with the first attribute set from the attribute set pair and an item from the second item category without the second attribute set from the attribute set pair at block 406. Further, at block 408, the recommendation system 150 determines a fourth count of purchases that include an item from the first item category without the first set attribute from the attribute set pair and an item from the second item category without the second attribute set from the attribute set pair. As with the first count, each of the counts determined in the blocks 404-408 may include counts for items that are viewed, or otherwise accessed, within a threshold time period of each other whether or not the items were purchased. Furthermore, each of the purchases, views, and/or other access events may be weighted within the count value based on, for example, how long ago the purchase, view, or access event occurred or the amount of time between an access of an item from the first item category with the first attribute set and an access of an item from the second item category with the second attribute set. An example matrix, or attribute matrix, is depicted in Table 2 for the four count values. In the example depicted in Table 2, S represents a source attribute or an attribute associated with the item accessed by a user (e.g., the attribute "3-D" for the LED TV) and T represents a target attribute or an attribute that may be associated with an item to be recommended to a user who accesses the item with the S attribute.

TABLE 2

|  | TV Accessory (3D Glasses) | TV Accessory (!3D Glasses) |
| --- | --- | --- |
| LED TV (3-D) | 6,029 (S and T) | 31,554 (S and !T) |
| LED TV (not 3-D) | 330 (!S and T) | 119,690 (!S and !T) |

In the example depicted in Table 2, the first item category is for LED TVs with the attribute "3-D" and the second item category is for TV Accessory with the attribute 3-D glasses. In some cases, the second item category could omit the attribute. In other words, in some cases the T could represent a TV accessory regardless of attribute (e.g., a wildcard attribute). Applying the process 400 to the example depicted in Table 2, the first count value, corresponding to users who accessed both LED TVs with the attribute "3-D" and TV Accessory with the attribute "3D Glasses" within a time period is 6,029. The second count value, corresponding to users who accessed an LED TV not associated with the attribute "3-D" and who accessed a TV Accessory with the attribute "3-D glasses" is 330. The third count value, corresponding to users who accessed an LED TV with the attribute "3-D" and who accessed a TV Accessory without the attribute "3-D glasses" is 31,554. Finally, the fourth count, corresponding to users who accessed an LED TV without the attribute "3-D" and who accessed a TV Accessory without the attribute "3-D glasses" is 119,690.

At block 410, the recommendation engine 152 generates one or more recommendation rules based on the first count, the second count, the third count, and the fourth count determined at the blocks 402-408. The recommendation rules may be generated using any type of machine learning process. Further, the recommendation rules may include a single attribute (e.g., a set of one) from each item category or multiple attributes from the item categories and may, in some cases, be built upon one another. For example, an initial recommendation rule may be generated based on the number of users who purchased an LED TV with the attribute "3-D" and also purchased a TV Accessory with the attribute "3-D glasses." This initial recommendation rule may then be combined with a recommendation rule derived from the number of users who purchased an LED TV with the attribute "42-inch" and who also purchased a TV Accessory with the attribute "2-Pack." The derived recommendation rule may include recommending a TV Accessory with the attribute set {3-D Glasses+2-Pack} to users who access LED TVs with the attribute set {3-D+42-inch}. The recommendation engine 152 may, in some cases, generate recommendation rules for pairs of items or item categories where one or more of the first count, second count, third count, and/or fourth count exceed or satisfy a threshold. In some such cases, if the threshold is not exceeded or satisfied, the recommendation engine 152 may not generate a recommendation rule for the pair of items or item categories. Alternatively, the recommendation engine 152 may generate a recommendation rule, but may weight the rule lower than rules generated for pairs of items or item categories with counts that do satisfy the threshold.

In some embodiments, the block 410 may include associating the derived recommendation rule with the item category of the item with the S attribute. Alternatively, or in addition, the recommendation rule may be associated with individual items, or individual items in a particular item category, that includes the S attribute. Furthermore, in some embodiments, the block 410 may include determining whether to associate the recommendation rule with items or an item category based on the score generated for the recommendation rule. In cases where the score does not satisfy a score threshold, the recommendation rule may be dropped, omitted, or ignored. Alternatively, the recommendation rule may be modified to serve as a negative recommendation rule, or a negative rule. The negative rule can include any type of rule identifying items not to recommend to a user in response to a determination that the user has accessed another item. For example, one negative rule may prevent a phone case with the attribute "LG" from being recommended to a user who is purchasing a phone with the attribute "APPLE." One example process for determining a score for a recommendation rule and for classifying the recommendation rule is described with respect to FIG. 5.

Example Recommendation Rule Evaluation Process

Figure 5:
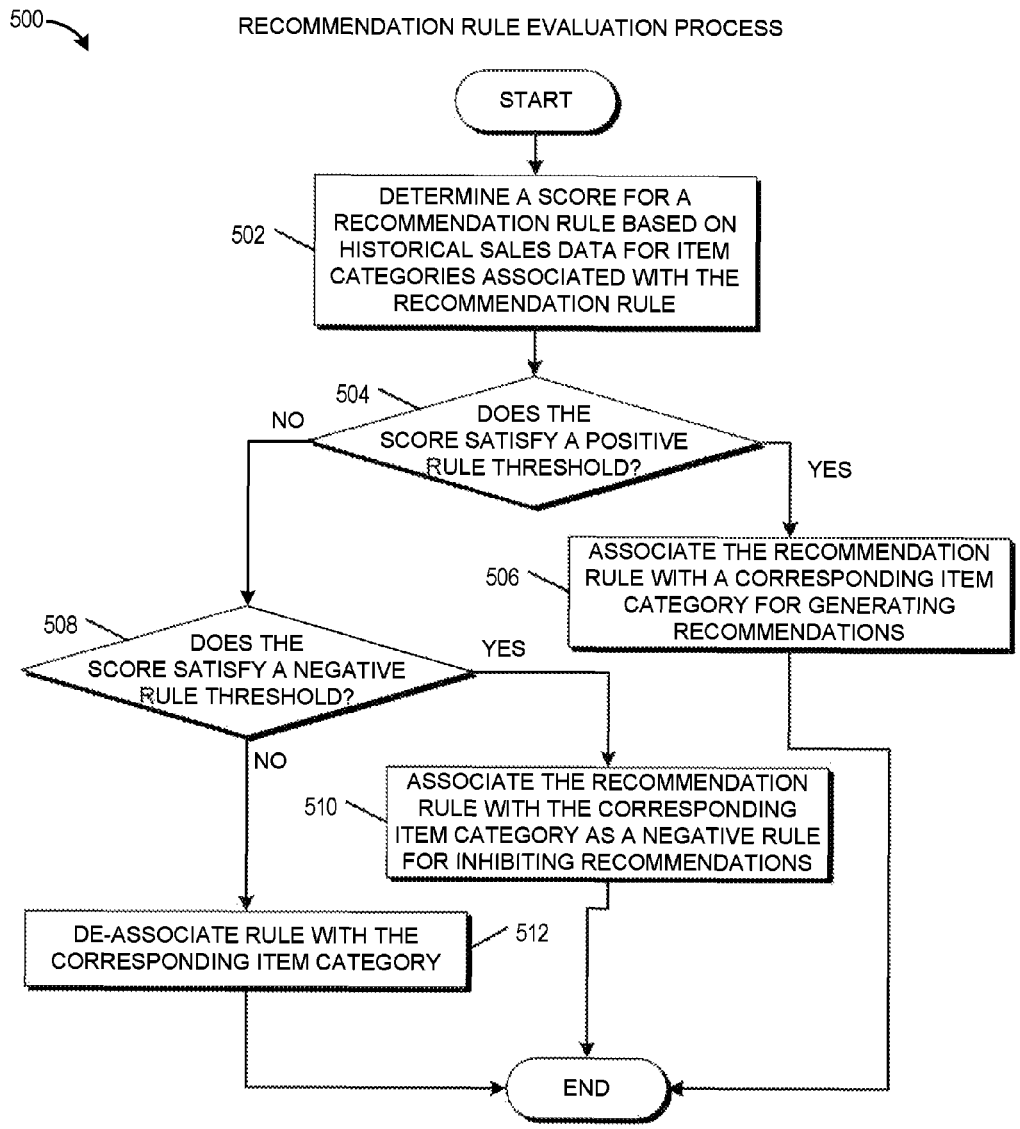
FIG. 5 illustrates a flow diagram for one embodiment of a recommendation rule evaluation process.

FIG. 5 illustrates a flow diagram for one embodiment of a recommendation rule evaluation process 500. The process 500 can be implemented by any system that can generate a score for a recommendation rule based on sales, or access, data used to generate the recommendation rule. Further, the process 500 may be implemented by any system that can evaluate and categorize the recommendation rule based on the generated score. For example, the process 500, in whole or in part, can be implemented by a recommendation system 150, a recommendation engine 152, or a recommendation rule generator 156. Although any number of systems, in whole or in part, can implement the process 500, to simplify discussion, the process 500 will be described with respect to particular systems.

The process 500 begins at block 502 where, for example, the recommendation rule generator 156 determines a score for a recommendation rule based on historical sales data for items or item categories associated with the recommendation rule. In some cases, the score is based on items with one or more attributes used to generate the recommendation rule. Further, in some cases, the score may be based at least in part on item accesses as well as or instead of sales data. In some example embodiments, the score may be determined by calculating posterior odds and prior odds for sales of items with attributes used to generate the recommendation rule. One example calculation of the score that may be generated at the block 502 is illustrated in equation (1) using the example data from Table 2.

$$\text{Score}: \frac{\text{Posterior Odds}}{\text{Prior Odds}} = \frac{\frac{P(S \text{ and } T)}{P(S \text{ and } !T)}}{\frac{P(T)}{P(!T)}} = \frac{\frac{0.038}{0.2}}{\frac{0.04}{0.96}} = 4.52 \quad (1)$$

In equation (1) as applied to the example described with respect to Table 2, P(S and T) refers to the probability that a user purchases both an LED TV with the attribute "3-D" and a TV Accessory with the attribute "3D glasses." In the example of Table 2, P(S and T) is 0.038. This value may be calculated by dividing the number of users who purchased both items by the total number or measure of users, which is determined by adding all the values of the matrix in Table 2. Performing a similar calculation, the value of P(S and !T), which refers to the probability that a user purchases a 3-D LED TV and a TV Accessory other than 3D glasses is 0.2. Further, the value of P(T), which refers to the probability that a user purchases 3D glasses, is 0.04 and the value P(!T), which refers to the probability that a user purchases something other than 3D glasses is 0.96.

At decision block 504, the recommendation rule generator 156 determines whether the score calculated at the block 502 satisfies a positive rule threshold. The positive rule threshold may be specified by a user (e.g., an administrator). Alternatively, or in addition, the positive rule threshold may be determined based on the items and/or item categories used to generate the recommendation rule.

If the recommendation rule satisfies the positive rule threshold, the recommendation rule generator 156, at block 506, associates the recommendation rule with a corresponding item category for generating recommendations for users who access items in the item category. In some cases, the recommendation rule is associated with a subset of items in the item category, such as with items that include the S attribute used to generate a recommendation. A recommendation rule associated with a score that satisfies the positive rule threshold may, in some cases, be termed a "positive recommendation rule."

In cases where the score does not satisfy the positive rule threshold, the recommendation rule generator 156 determines whether the score satisfies a negative rule threshold at the decision block 508. If the score does satisfy the negative rule threshold, the recommendation rule generator 156 associates the recommendation rule with the corresponding item category as a negative rule for inhibiting or filtering recommendations at block 510. In some embodiments, the block 510 may include modifying the recommendation rule to serve as a negative rule. For instance, with reference to Table 2 and the score calculated above, suppose that the initial recommendation rule states that: "if a user purchases a LED TV with the attribute '3-D,' a TV Accessory with the attribute "3D glasses" should be recommended to the user." If it is determined that the recommendation rule should be a negative rule, the initial recommendation rule may be modified to state that: "if a user purchases a LED TV with the attribute '3-D,' a TV Accessory with the attribute "3D glasses" should not be recommended to the user."

If it is determined at the decision block 508 that the score does not satisfy the negative rule threshold, the recommendation rule is disassociated from a corresponding item category at block 512. Alternatively, the recommendation rule is ignored, omitted, deleted, or marked as a poor recommendation rule. In some cases, the process 500 may be repeated for a recommendation rule that does not satisfy either the positive rule threshold or the negative rule threshold on a periodic basis or in response to receiving new sales data. Further, in some cases, the process 500 may be repeated for recommendation rules that do satisfy either the positive rule threshold or the negative rule threshold. Advantageously, in certain embodiments, by repeating the process 500 for a recommendation rule, the recommendation rule may be reclassified in cases where sales data captures a change in user behavior and/or where prior sales data was insufficient to accurately classify the recommendation rule.

In some embodiments, the process 500 may be performed on a periodic basis for a recommendation rule. Further, a recommendation rule that is originally classified as a positive recommendation rule, may in some cases be reclassified as a negative rule. For instance, additional sales data or access data may be obtained since the previous performance of the process 500 that results in the score for the recommendation being modified. This modification in the score can result in the recommendation rule being reclassified as a negative rule. Similarly, a negative rule may be reclassified as a positive recommendation rule. In either case, the recommendation rule may be modified in addition to being reclassified. This modification may cause the recommendation rule to select items or not select items to recommend based on the modification to the recommendation rule.

In some embodiments, the decision block 508, the block 510, and/or the block 512 may be omitted. For example, some systems may be configured without negative rules. Further, the process 500 is not limited to being performed as illustrated in FIG. 5 or as described above. For example, the decision block 504 and the decision block 508 may be performed in parallel or in a different order from the order described above.

Example Recommendation Process

Figure 6:
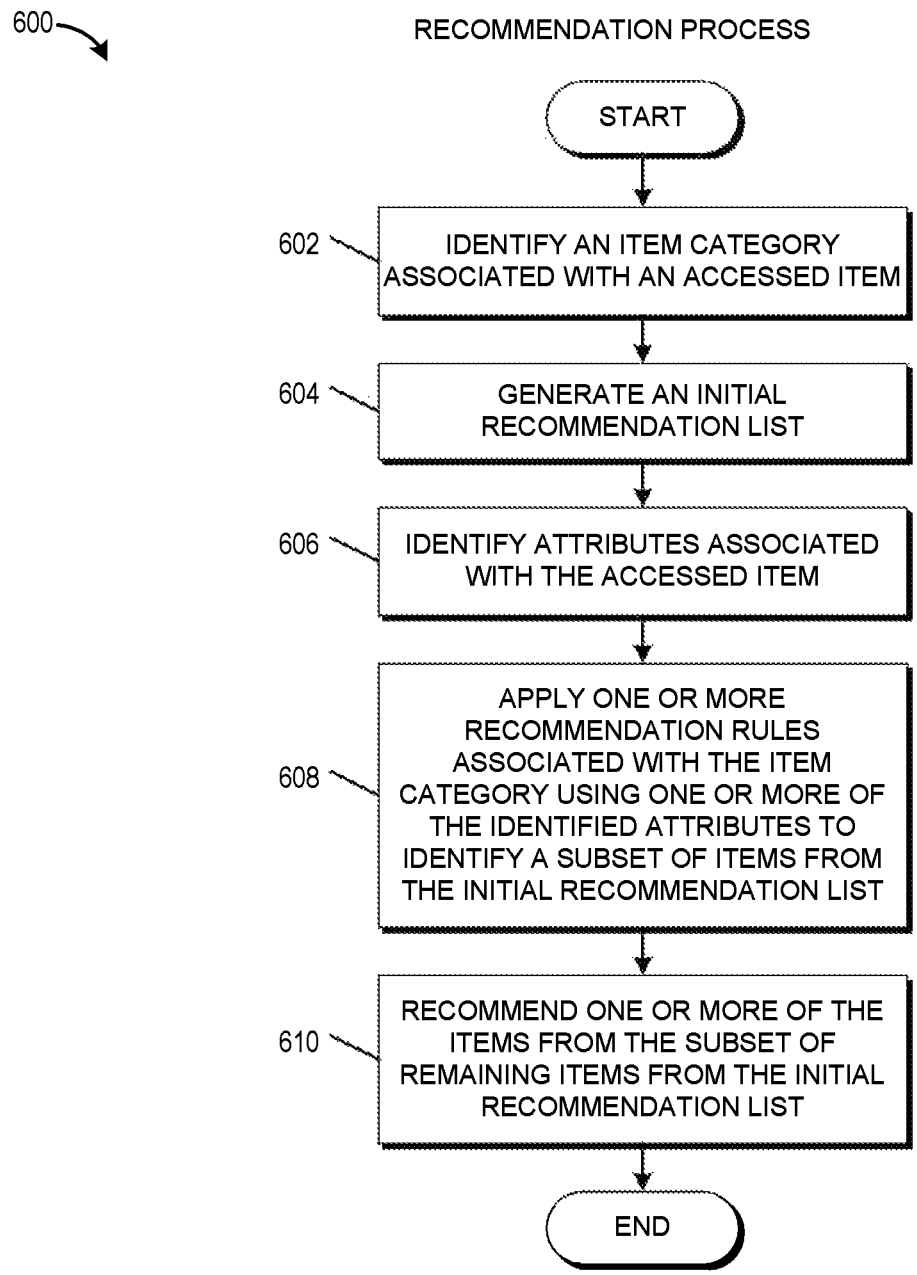
FIG. 6 illustrates a flow diagram for one embodiment of a recommendation process.

FIG. 6 illustrates a flow diagram for one embodiment of a recommendation process 600. The process 600 can be implemented by any system that can generate a recommendation. For example, the process 600, in whole or in part, can be implemented by a recommendation system 150, a recommendation engine 152, or an attribute extractor 154. Although any number of systems, in whole or in part, can implement the process 600, to simplify discussion, the process 600 will be described with respect to particular systems.

Process 600 begins at block 602 where, for example, the recommendation engine 152 identifies an item category associated with an accessed item. The accessed item may include an item purchased by a user, and item whose item detail page is viewed by the user, or an item that is otherwise identified as being of interest to the user. At block 604, the recommendation engine 152 generates an initial recommendation list. This initial recommendation list may be generated based on a sales data ranking list, a relationship between item categories or browse nodes, or using existing recommendation algorithms. Further, in some cases, the initial recommendation list may be generated based on item-to-item relationships for the accessed item and/or historical sales data for the accessed item. In certain embodiments, the block 604 may be omitted. For example, if the accessed item is a new item, an initial recommendation list may not exist for the accessed item.

At block 606, the attribute extractor 154 identifies one or more attributes associated with the accessed item. The recommendation engine 152, at block 608, applies one or more recommendation rules associated with the accessed item and/or the item category of the accessed item using one or more of the attributes identified at the block 606 to identify a subset of items from the initial recommendation list. Alternatively, such as in cases where the block 604 is omitted, the block 608 may apply the one or more recommendation rules to identify a set of items to recommend from one or more item categories associated with the one or more recommendation rules associated with the attributes identified at the block 606.

At block 610, the recommendation engine 152 recommends one or more of the items from the subset of remaining items from the initial recommendation list. Advantageously, in certain embodiments, by recommending an item from the subset of remaining items, an improved recommendation may be made because the recommendation may be associated not only with an item or item type, but also with attributes of the item. In some instances, such as in cases where the block 604 is omitted, the recommendation engine 152 recommends one or more of the items identified by applying the one or more recommendation rules to identify items from one or more item categories associated with the one or more recommendation rules. Recommending the one or more items may include presenting the recommendation on an item detail page for the accessed item. Alternatively, or in addition, recommending the one or more items may include emailing the recommendation to a user, presenting the recommendation in a dialog box, texting the recommendation to the user, providing the user with a coupon for the recommended item or items, or any other method for recommending one or more items to a user.

Further, in some embodiments, the block 610 may include outputting a message with the recommendation of the one or more items describing the one or more recommendation rules used to identify the recommended items. In other words, in some instances, the recommendation engine 152 may inform a user that a particular item was recommended because the user accessed another item associated with a recommendation rule. Further, in such instances, the recommendation engine 152 may state the recommendation rule. Advantageously, in certain embodiments, by informing a user of how a recommendation was derived, the recommendation can be more effective and may be more likely to result in a purchase of the recommended item.

In certain embodiments, the process 600 may be used to generate a recommendation to users who access an item with little or no access history. Generating recommendations for items with little or no access history may be referred to as a cold start recommendation process. Another example embodiment of a cold start recommendation process is described below with reference to FIG. 7.

Example Cold Start Recommendation Process

Figure 7:
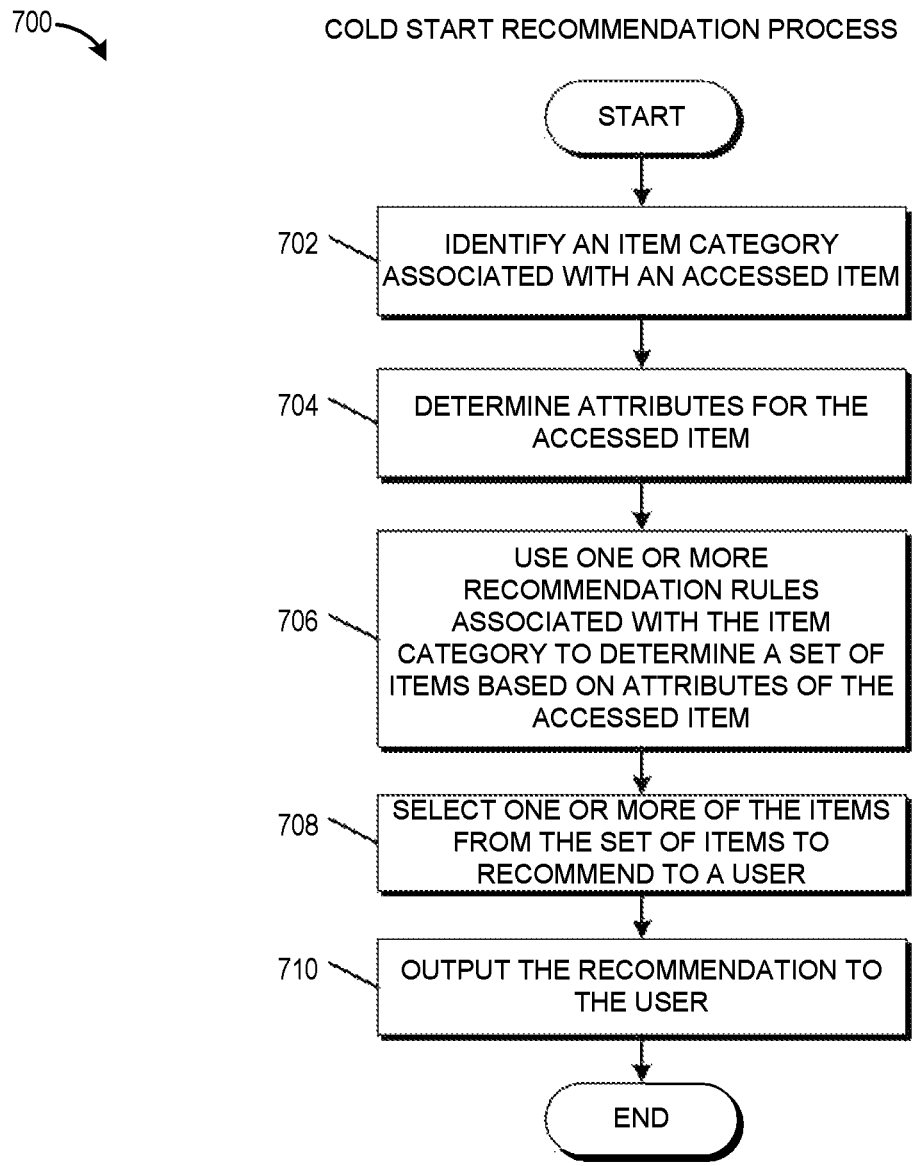
FIG. 7 illustrates a flow diagram for one embodiment of a cold start recommendation process.

FIG. 7 illustrates a flow diagram for one embodiment of a cold start recommendation process. The process 700 can be implemented by any system that can perform a cold start recommendation process and/or identify items to recommend for an item that has no access history or less that a threshold amount of access history. For example, the process 700, in whole or in part, can be implemented by a recommendation system 150, a recommendation engine 152, or an attribute extractor 154. Although any number of systems, in whole or in part, can implement the process 700, to simplify discussion, the process 700 will be described with respect to particular systems.

Process 700 begins at block 702 where, for example, the recommendation engine 152 identifies an item category associated with an accessed item. At block 704, the attribute extractor 154 determines one or more attributes of the accessed item. The block 704 may include extracting the one or more attributes of the accessed item. Alternatively, or in addition, the block 704 may include accessing the attributes from a repository, such as the item data repository 146. In certain embodiments, the blocks 702 and 704 may be omitted during execution of the process 700. For example, the operations associated with the blocks 702 and 704 may be performed a priori or at some time prior to execution of the process 700. In some instances, one or more of the blocks 702 and 704 may be performed on a periodic basis for an item or for items in an electronic catalog.

The recommendation engine 152, at block 706, uses one or more recommendation rules associated with the item category to determine a set of items based on the attributes of the accessed item. These recommendation rules may be selected based on the one or more attributes of the accessed item. For example, suppose the item is a camera, the recommendation rules may initially be determined based on the rules associated with the camera item category. From the initially identified recommendation rules, the recommendation engine 152 may select a subset of recommendation rules based on one or more attributes of the camera accessed at the block 702, such as a level of optical zoom (e.g., 5× optical zoom). The subset of recommendation rules may be used to determine a camera case, a memory card, and/or a battery to recommend to the user who accessed the camera. Advantageously, in certain embodiments, the recommended items may be selected with a minimal likelihood or probability that the recommended items are of interest to the user despite little or no sales history or access history for the camera. This is because, for example, historical data for existing items may be used to help predict the interest of a user in the recommended items that are generated as recommendations for items without historical data that are related to existing items.

At block 708, the recommendation engine 152 selects one or more of the items from the set of items identified at the block 706 to recommend to a user. In certain embodiments, the block 708 may include using sales ranking data and/or other rankings to select the one or more items to recommend from the identified set of items. Alternatively, or in addition, the block 708 may include other filters for selecting one or more items to recommend from the identified set of items. For example, additional filters may be based on user generated lists (e.g., favorite lists, popularity lists, etc.), user-to-user relationships, item-to-item relationships, user purchase history, and any other information or relationships that may be used to filter the identified set of items. At block 710, the recommendation system 150 outputs the recommendation to the user. In certain embodiments, the block 710 may include one or more of the embodiments described with respect to the block 610.

In some embodiments, the process 700 may be phased out over time for an item. For example, recommendations associated with a new item may be generated using the process 700. However, as the amount of access data associated with the item increases over time, use of the process 700 may be phased out or eliminated because the collected access data may reach a point where other recommendation algorithms or systems may be utilized. In some embodiments, once a threshold quantity of access data is collected, the recommendation system 150 may begin using the process 600, or other recommendation process, instead of the process 700.

Example Recommendation Process Using Negative Rules

Figure 8:
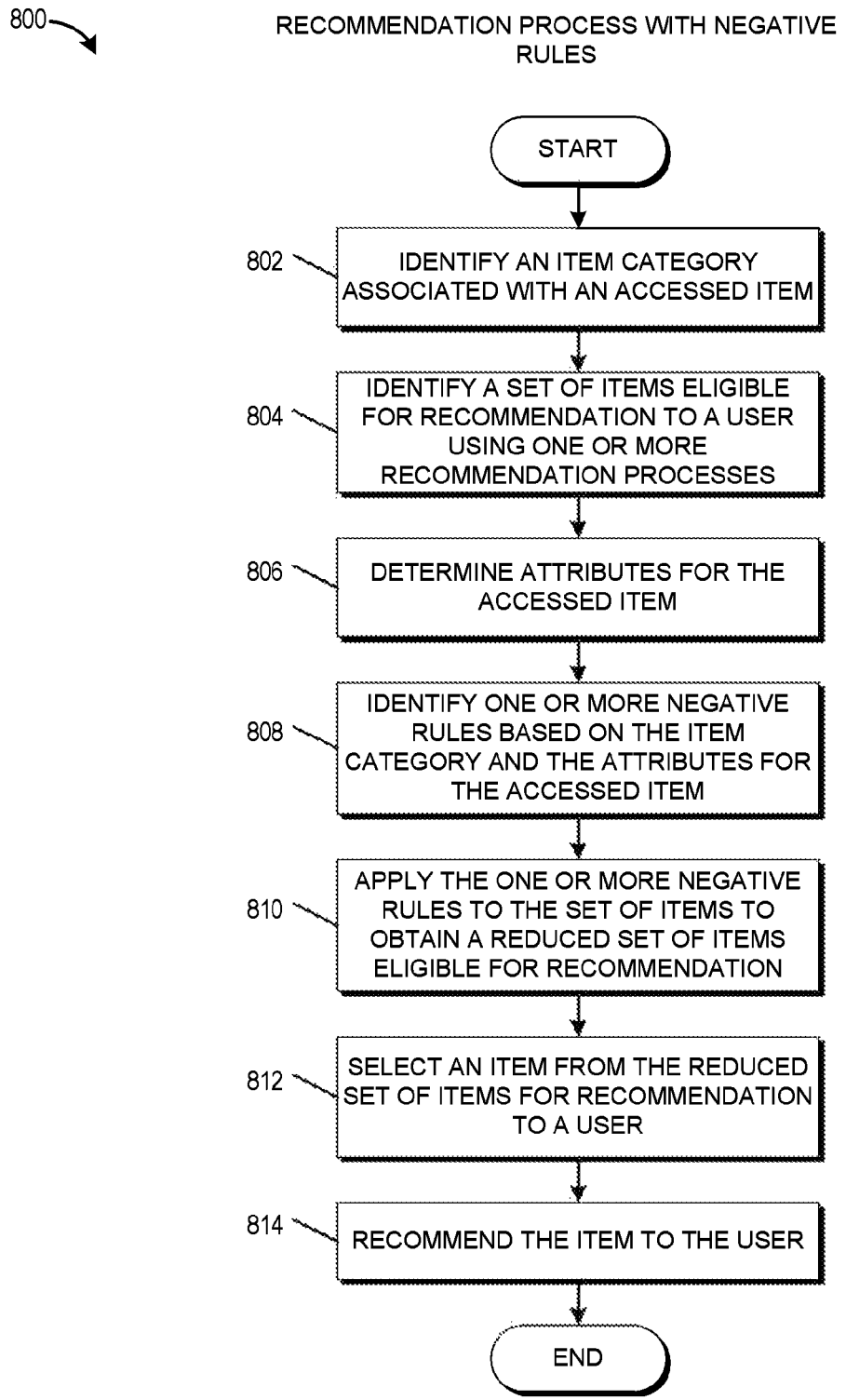
FIG. 8 illustrates a flow diagram for one embodiment of a recommendation process using negative rules.

FIG. 8 illustrates a flow diagram for one embodiment of a recommendation process 800 using negative rules. The process 800 can be implemented by any system that can generate a recommendation using negative rules. For example, the process 800, in whole or in part, can be implemented by a recommendation system 150, a recommendation engine 152, or an attribute extractor 154. Although any number of systems, in whole or in part, can implement the process 800, to simplify discussion, the process 800 will be described with respect to particular systems.

Process 800 begins at block 802 where, for example, the recommendation engine 152 identifies an item category associated with an accessed item. At block 804, the recommendation engine 152 identifies a set of items eligible for recommendation to a user using one or more recommendation processes. These recommendation processes may include the process for generating a recommendation of one or more items. For example, the recommendation processes can include the process 600, the process 700, recommending a bestseller item in the item category identified at the block 802, or recommending an item using an item-to-item or user-to-user recommendation process.

At block 806, the attribute extractor 154 determines attributes for the accessed item. As previously described, the attributes may be determined by extracting attributes from descriptive content associated with the accessed item and/or by accessing attributes or metadata associated with the item from a repository, such as the item data repository 146.

The recommendation engine 152, at block 808, identifies one or more negative rules based on one or more of the item category and the attributes for the accessed item. At block 810, the recommendation engine 152 applies the one or more negative rules to the set of items identified at the block 804 to obtain a reduced set of items eligible for recommendation. The negative rules may include any type of rule for determining that an item should not be recommended to a user. For example, the negative rule may state that "users who access an item with attributes A, B, and C should not be recommended items with attributes X, Y, and Z." Alternatively, the negative rule may state that "access of an item with attributes A, B, and C should not be used as a basis to recommend items with attributes X, Y, and Z." However, in some cases, items with the attributes X, Y, and Z may still be recommended or eligible for recommendation to a user based on other recommendation rules. In other cases, items with the attributes X, Y, and Z may no longer be eligible for recommendation based on the application of the negative rule. In some cases, this negative rule is applied to items from some item categories (e.g., item categories 1 and 2), but not to items from other item categories (e.g., item category 3). As previously described, in some cases, this negative rule may be derived by analyzing historical access data for items to determine a frequency or rate that items from item categories 1 and 2 with the attributes A, B, and C are accessed within a threshold time period has items with attributes X, Y, and Z.

In some embodiments, the reduced set of items may include no items. In such cases, alternative recommendation processes may be performed. Alternatively, the process 800 may end without generating a recommendation. In some cases, the reduced set of items may be the same set of items is identified at the block 804. For example, if none of the one or more negative rules applies to the items in the set of items identified at the block 804, the reduced set of items will be equivalent to the set of items identified at the block 804.

At block 812, the recommendation engine 152 selects an item from the reduced set of items for recommendation to a user. In some cases, the recommendation engine 152 may select some or all of the items from the reduced set of items to recommend. The recommendation engine 152 recommends the selected items to the user at the block 814. In certain embodiments, the block 814 may include one or more of the embodiments previously described with respect to the blocks 610 and 710.

In certain embodiments, the process 800 may include the use of both positive recommendation rules and negative recommendation rules. For example, at the block 804, a positive recommendation rule may be applied that identifies large camera bags to be recommended to users who access digital SLR cameras. At the block 810 a negative recommendation rule may be applied that states that users who access NIKON digital SLR cameras should not be recommended CANON large camera bags. Using this negative recommendation rule, the original number of items identified at the block 804 may be reduced to a smaller number of items. One or more of the items from the reduced set of large camera bag items may be recommended to the user at the block 814 in response to the user accessing a NIKON digital SLR camera.

Additional Embodiments

In some embodiments, the recommendation system 150 using, for example, the recommendation rule generator may detect a behavior-based association between a first item facet or attribute and a second item facet or attribute. This detection or determination may be based, at least in part, on selections or accesses by users of catalog items in an electronic catalog. In some cases, a first set of items in the item catalog may have the first item facet and a second set of items may have the second item facet.

Further, the recommendation system 150 may identify a catalog item having the first item facet and may select a second catalog item having the second facet to recommend to users who select the catalog item with the first item facet. In some cases, the second catalog item may be selected based at least partially on the behavior-based association between the first item facet and the second item facet. In some cases, the facets include multiple attributes and/or an identification of an item category.

In certain embodiments, the recommendation system 150 may use the behavior-based association between the first item facet and the second item facet to generate a recommendation in response to a determination that a recommendation based solely on item-to-item associations would be unreliable. This determination may be based on the number of item-to-item associations that exist for the catalog item having the first facet. Alternatively, or in addition, the determination may be based on the amount of access data that exists for the catalog item and/or the amount of time that the catalog item has existed in the item catalog.

In some cases, detecting the behavior-based association may include comparing a measure of how frequently a catalog item with the first item facet is purchased or accessed together with a catalog item having the second item facet to a measure of how frequently the catalog item with the first item facet is purchased together with a catalog item not having the second item facet. Alternatively, or in addition, detecting the behavior-based association may include comparing a measure of how frequently a catalog item with the first item facet is purchased or accessed together with a catalog item having the second item facet to a measure of how frequently the catalog item with the first item facet is purchased alone. In some embodiments, items accessed or purchased within a threshold time period of each other are counted as being purchased or accessed together. For example, items accessed or purchased within one week of each other may be considered as being purchased as part of the same transaction. However, in some such cases, items purchased separately, but within the threshold time period to be counted as the same transaction, may be weighted differently than items purchased at the same time as part of the same transaction when developing facet-to-facet associations. Further, in some cases, the weight applied to a transaction or access event may be based on the amount of time between the access of a first item and the access of a second item that is considered a single transaction or access event for generating attribute-to-attribute associations.

In some embodiments, the second item is recommended to a user via an item detail page or an electronic catalog page. In some cases, the second item is recommended by supplementing an electronic catalog page corresponding to the first catalog item with a recommendation of the second catalog item. In some cases, the recommendation may include an indication that users who purchase items having the first item facet also purchase items having the second item facets. Further, in some cases, the indication may include an identification of how often users who purchase items having the first item facet also purchase items having the second item facets.

In some embodiments, item-to-item associations that indicate users who access item A when accessing item B at a threshold rate may be used to generate recommendations for users. In some such embodiments, when insufficient item-to-item associations exist, facet-to-facet associations may be used to generate the recommendations. Alternatively, item-to-item associations may be used in conjunction with facer-to-facet associations to generate recommendations.

The embodiments of the present disclosure have primarily been described with respect to catalog items. However, this disclosure is not limited as such. In some embodiments, an item may include articles, blog posts, authors, or other types of items that are not catalog items. For example, in some embodiments, the present disclosure may be used to detect associations between attributes of news articles. The attributes of the news articles may be generated by extracting words or phrases that are characterizing of the news articles or that can distinguish news articles. In some cases, there words of phrases may be used as the attributes of the news articles.

Terminology

A number of computing systems have been described throughout this disclosure. The descriptions of these systems are not intended to limit the teachings or applicability of this disclosure. For example, the recommendation system 150 described herein can generally include any computing device(s), such as desktops, laptops, servers, and distributed computing systems, to name a few. As a second example, the user systems 102 can generally include any computing device(s), such as desktops, laptops, servers, video game platforms, television set-top boxes, televisions (e.g., internet TVs), computerized appliances, and wireless mobile devices (e.g. smart phones, PDAs, tablets, electronic book readers, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated as part of the interactive computing system 110 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. For example, blocks 504 and 508 of the process 500 may be performed in reverse order or at least partially in parallel.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) and/or various digital logic that that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, operation, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A computer-implemented method of determining an item to recommend, the computer-implemented method comprising:
    detecting a behavior-based association between a first item facet and a second item facet based on selections by users of catalog items in an electronic catalog, wherein a first plurality of the catalog items have the first item facet and a second plurality of the catalog items have the second item facet the first item facet comprising a first attribute shared among a first plurality of items, and the second item facet comprising a second attribute shared among a second plurality of items, the second attribute differing from the first attribute;
    identifying a first catalog item having the first item facet;
    determining a plurality of recommendation rules for the first catalog item, wherein performance of different recommendation rules of the plurality of recommendation rules results in identification of different sets of items for recommendation to users who access the first catalog item;
    scoring each of the plurality of recommendation rules to obtain a score for each recommendation rule, the score generated based at least in part on a ratio of posterior odds to prior odds determined from historical item-access data associated with the recommendation rule;
    classifying the plurality of recommendation rules based at least in part on a determination of whether the score associated with each of the recommendation rules satisfies a score threshold to obtain a first set of recommendation rules that satisfy the score threshold and a second set of recommendation rules that do not satisfy the score threshold, wherein the first set of recommendation rules comprise positive recommendation rules and the second set of recommendation rules comprise negative recommendation rules;
    receiving additional item-access data associated with at least one recommendation rule from the second set of recommendation rules;
    rescoring the at least one recommendation rule based on the additional item-access data to obtain an updated score;
    reclassifying the at least one recommendation rule based at least in part on a determination that the updated score satisfies the score threshold, wherein reclassifying the at least one recommendation rule comprises removing the at least one recommendation rule from the second set of recommendation rules and adding the at least one recommendation rule to the first set of recommendation rules;
    selecting a recommendation rule from the first set of recommendation rules based at least in part on the score associated with the recommendation rule;
    selecting, using the selected recommendation rule and based at least partly on the behavior-based association between the first and second item facets, a second catalog item to recommend to users who select the first catalog item, said second catalog item having the second facet; and
    outputting for recommendation the second catalog item to a user who selected the first catalog item,
    wherein the computer-implemented method is performed programmatically by a computing system comprising one or more computing devices.

2. The computer-implemented method of claim 1, wherein the selections comprise purchases.

3. The computer-implemented method of claim 1, wherein selecting the second catalog item comprises selecting a top ranked item from the second plurality of the catalog items that have the second item facet.

4. The computer-implemented method of claim 1, wherein selecting the second catalog item comprises relying on the behavior-based association between the first and second item facet in response to determining that a recommendation based solely on item-to-item behavioral associations would be unreliable.

5. The computer-implemented method of claim 1, wherein the first item facet comprises an item category identifier in combination with the first attribute.

6. The computer-implemented method of claim 1, wherein the first and second item facets correspond to different respective item categories.

7. The computer-implemented method of claim 1, wherein detecting the behavior-based association comprises comparing (1) a measure of how frequently a catalog item having the first item facet is purchased together with a catalog item having the second item facet, to (2) a measure of how frequently a catalog item having the first item facet is purchased together with a catalog item not having the second item facet.

8. The computer-implemented method of claim 1, further comprising supplementing an electronic catalog page corresponding to the first catalog item with a recommendation of the second catalog item.

9. The computer-implemented method of claim 8, wherein the recommendation comprises an indication that users who purchase items having the first item facet also purchase items having the second item facet.

10. A computer-implemented method of determining a set of items to recommend in association with behaviorally-deficient items, the computer-implemented method comprising:

as implemented by a computing system including one or more hardware processors, identifying a first item for which item-level association data is deficient, wherein the item-level association data identifies items that are related to each other based on a determined relationship between a first item facet and a second item facet and based on selections by users of catalog items in an electronic catalog, wherein a first plurality of the catalog items have the first item facet and a second plurality of the catalog items have the second item facet, the first item facet comprising a first attribute shared among a first plurality of items, and the second item facet comprising a second attribute shared among a second plurality of items, the second attribute differing from the first attribute, and wherein the first item is determined to be associated with a set of items based on a history of transactions that include the first item and an item from the set of items;

extracting an attribute for the first item;

determining an item category for the first item;

accessing a set of recommendation rules associated with the item category, the set of recommendation rules generated based on attribute pairs comprising the first attribute and the second attribute and based on a determination that users who access an item having the first attribute access an item having the second attribute at a threshold rate, wherein the first attribute is associated with at least some items of the item category and the second attribute is associated with at least some items of another item category, wherein performance of different recommendation rules of the set of recommendation rules results in identification of different sets of items for recommendation to users who access the first item;

scoring each of the set of recommendation rules to obtain a score for each recommendation rule, the score generated based at least in part on a ratio of posterior odds to prior odds determined from historical item-access data associated with the recommendation rule;

classifying at least one recommendation rule from the set of recommendation rules as a positive recommendation rule based at least in part on a determination that the score associated with the at least one recommendation rule satisfies a score threshold;

receiving additional item-access data associated with the at least one recommendation rule from the set of recommendation rules;

rescoring the at least one recommendation rule based on the additional item-access data to obtain an updated score;

reclassifying the at least one recommendation rule as a negative recommendation rule based at least in part on a determination that the updated score does not satisfy the score threshold, wherein reclassifying the at least one recommendation rule comprises removing the at least one recommendation rule from the set of recommendation rules to obtain a reduced set of recommendation rules;

selecting a first recommendation rule from the reduced set of recommendation rules based at least in part on the attribute for the first item and the score associated with the first recommendation rule;

generating a recommendation for a second item based at least in part on using the first recommendation rule; and outputting the recommendation for presentation to a user who accesses the first item.

11. The computer-implemented method of claim 10, wherein the attribute is extracted from descriptive text content associated with the first item.

12. The computer-implemented method of claim 11, wherein the descriptive text content includes at least one of the following: a title, a manufacturer description, a user review, and item details.

13. The computer-implemented method of claim 10, wherein the first item includes the first attribute used to generate the first recommendation rule and the second item includes the second attribute used to generate the first recommendation rule.

14. The computer-implemented method of claim 10, further comprising:

selecting a second recommendation rule from the set of recommendation rules based on the attribute for the first item; and preventing a third item from being recommended based at least in part on using the second recommendation rule.

15. The computer-implemented method of claim 10, wherein the second item is associated with a different item category than the item category for the first item.

16. The computer-implemented method of claim 10, wherein presenting the recommendation of the second item to the user includes presenting a message identifying the first recommendation rule to the user.

17. The computer-implemented method of claim 10, wherein generating the recommendation for the second item further comprises:

using the first recommendation rule to identify a plurality of items; and selecting the second item from the plurality of items based on sales ranking data.

18. A system for determining a set of items to recommend in association with behaviorally-deficient items, the system comprising:

a recommendation system comprising computing hardware comprising one or more computer processor, the recommendation system configured to:

identify a first item from an electronic catalog without recommendation data, wherein at least some items in the electronic catalog are related to each other based on a determined relationship between a first item facet and a second item facet and based on selections by users of catalog items in the electronic catalog, wherein a first plurality of the catalog items have the first item facet and a second plurality of the catalog items have the second item facet, the first item facet comprising a first attribute shared among a first plurality of items, and the second item facet comprising a second attribute shared among a second plurality of items, the second attribute differing from the first attribute;

extract at least one attribute for the first item;

determine an item category for the first item;

access a set of recommendation rules associated with the item category, the set of recommendation rules generated based at least in part on sets of attributes, each set of attributes comprising at least one attribute associated with at least some items of the item category and at least one attribute associated with at least some items of another item category, and wherein the recommendation rules are generated based at least in part on a determination that users who access items having the at least one attribute associated with the at least some items of the item category access items having the at least one attribute associated with the at least some items of another item category at a threshold rate;

score each of the set of recommendation rules to obtain a score for each recommendation rule, the score generated based at least in part on a ratio of posterior odds to prior odds determined from historical item-access data associated with the recommendation rule;

remove a recommendation rule from the set of recommendation rules based at least in part on a determination that the score associated with the recommendation rule does not satisfy a score threshold;

receive additional item-access data associated with the recommendation rule removed from the set of recommendation rules;

rescore the recommendation rule based on the additional item-access data to obtain an updated score;

restore the recommendation rule to the set of recommendation rules based at least in part on a determination that the updated score does satisfy the score threshold;

select a first recommendation rule from the set of recommendation rules based at least in part on the at least one attribute for the first item and the score associated with the first recommendation rule;

generate a recommendation for a second item based at least in part on the first recommendation rule; and outputting the recommendation for presentation to a user who accesses the first item.

19. The system of claim 18, wherein the recommendation data comprises a set of recommendations for an item determined based on item access history for accesses that include the item and for accesses that include additional items occurring within a threshold time period as the accesses that include the item.

20. The system of claim 18, wherein the first recommendation rule is generated based at least partially on the at least one attribute for the first item and at least one attribute of the second item.

21. The system of claim 18, wherein the recommendation system is further configured to:

select a second recommendation rule from the set of recommendation rules based at least in part on the at least one attribute for the first item; and prevent a third item from being recommended based at least in part on the second recommendation rule.

22. The system of claim 18, wherein the second item is associated with a different item category than the item category for the first item.

23. The system of claim 18, wherein the recommendation system is further configured to output a message specifying the first recommendation rule with the recommendation of the second item.

24. The system of claim 18, wherein the recommendation system is further configured to:

use the first recommendation rule to identify a plurality of items; and select the second item from the plurality of items based at least partially on sales ranking data.

25. Non-transitory physical computer storage comprising instructions stored thereon that, when executed by one or more processors, are configured to implement a system for determining a set of items to recommend, the system comprising:

a recommendation system configured to:

identify a first item from an electronic catalog associated with less than a threshold amount of access history, wherein at least some items in the electronic catalog are related to each other based on a determined relationship between a first item facet and a second item facet and based on selections by users of catalog items in the electronic catalog, wherein a first plurality of the catalog items have the first item facet and a second plurality of the catalog items have the second item facet, the first item facet comprising a first attribute shared among a first plurality of items, and the second item facet comprising a second attribute shared among a second plurality of items, the second attribute differing from the first attribute;

determine at least one attribute for the first item;

access a set of recommendation rules associated with the first item, the set of recommendation rules generated based on sets of attributes;

score each of the set of recommendation rules to obtain a score for each recommendation rule, the score generated based at least in part on a ratio of posterior odds to prior odds determined from historical item-access data associated with the recommendation rule;

remove a recommendation rule from the set of recommendation rules based at least in part on a determination that the score associated with the recommendation rule does not satisfy a score threshold;

receive additional item-access data associated with the recommendation rule removed from the set of recommendation rules;

rescore the recommendation rule based on the additional item-access data to obtain an updated score;

restore the recommendation rule to the set of recommendation rules based at least in part on a determination that the updated score does satisfy the score threshold select a first recommendation rule from the set of recommendation rules based at least in part on the at least one attribute for the first item and the score associated with the first recommendation rule;

generate a recommendation for a second item based at least in part on the first recommendation rule and output the recommendation for presentation to a user who accesses the first item.

26. The non-transitory physical computer storage of claim 25, wherein the access history comprises accesses of the first item and accesses of additional items that occur within a threshold time period of the accesses of the first item.

27. The non-transitory physical computer storage of claim 25, wherein the recommendation system is further configured to output the recommendation of the second item for presentation to the user along with a message identifying the first recommendation rule.

28. The non-transitory physical computer storage of claim 25, wherein the recommendation system is further configured to:
  use the first recommendation rule to identify a plurality of items; and
  select the second item from the plurality of items based at least partially on one or more filters.

* * * * *